(12) United States Patent
Ma et al.

(10) Patent No.: US 12,494,066 B1
(45) Date of Patent: Dec. 9, 2025

(54) SYSTEMS AND METHODS FOR CONSTRUCTION ZONE DETECTION

(71) Applicant: Zoox, Inc., Foster City, CA (US)

(72) Inventors: Derek Xiang Ma, San Carlos, CA (US); William Harland Montgomery, IV, Burlingame, CA (US); Adam Edward Pollack, Ramsey, NJ (US); Hang Ren, San Mateo, CA (US); Oytun Ulutan, Buena Park, CA (US)

(73) Assignee: Zoox, Inc., Foster City, CA (US)

( * ) Notice: Subject to any disclaimer, the term of this patent is extended or adjusted under 35 U.S.C. 154(b) by 465 days.

(21) Appl. No.: 17/931,652

(22) Filed: Sep. 13, 2022

(51) Int. Cl.
| | |
|---|---|
| *G06V 20/58* | (2022.01) |
| *B60W 40/04* | (2006.01) |
| *B60W 60/00* | (2020.01) |
| *G06V 10/25* | (2022.01) |
| *G06V 10/26* | (2022.01) |
| *G06V 10/75* | (2022.01) |
| *G06V 10/80* | (2022.01) |
| *G06V 10/82* | (2022.01) |

(52) U.S. Cl.
CPC ............ *G06V 20/58* (2022.01); *B60W 40/04* (2013.01); *B60W 60/0015* (2020.02); *G06V 10/25* (2022.01); *G06V 10/26* (2022.01); *G06V 10/751* (2022.01); *G06V 10/80* (2022.01); *G06V 10/82* (2022.01); *B60W 2420/403* (2013.01); *B60W 2556/35* (2020.02)

(58) Field of Classification Search
CPC ........ G06V 20/58; G06V 10/25; G06V 10/26; G06V 10/751; G06V 10/80; G06V 10/82; B60W 40/04; B60W 60/0015; B60W 2420/403; B60W 2556/35

See application file for complete search history.

(56) References Cited

U.S. PATENT DOCUMENTS

| | | | |
|---|---|---|---|
| 2010/0104199 A1* | 4/2010 | Zhang | G08G 1/166 382/199 |
| 2018/0314253 A1* | 11/2018 | Mercep | G06V 10/803 |
| 2019/0361454 A1* | 11/2019 | Zeng | G05D 1/0274 |
| 2021/0279659 A1* | 9/2021 | Torttila | G06T 7/13 |
| 2021/0342608 A1* | 11/2021 | Smolyanskiy | G06V 10/82 |

(Continued)

OTHER PUBLICATIONS

Karhikeyan, Vision-Based Road Construction Site Detection and Localization, 2020, Espoo, pp. 1-51. (Year: 2020).*

(Continued)

*Primary Examiner* — Kathleen M Broughton
(74) *Attorney, Agent, or Firm* — Lee & Hayes, P.C.

(57) ABSTRACT

Techniques for detecting and labeling construction zones in an environment are disclosed. Two-dimensional images may be evaluated to identify pixels that may be associated with a construction zone and labeled accordingly. Labels for corresponding pixels in a separate image or non-construction zone labels for the same pixels may be compared to the construction zone pixels and an output image pixel label may be determined based on one or more criteria. An output image can be provided for vehicle control and for other operations, such as top-down segmentation and trajectory determination. Output images and related data may also be used to train a model to perform construction zone detection and labeling.

20 Claims, 5 Drawing Sheets

(56) References Cited

U.S. PATENT DOCUMENTS

2021/0406560 A1* 12/2021 Park .................. G01S 17/931
2022/0161815 A1*  5/2022 Van Beek ............ B60W 40/09

OTHER PUBLICATIONS

Lin et al., Focal Loss for Dense Object Detection, 2017, IEEE International Conference on Computer Vision, pp. 1-10. (Year: 2017).*

Hu et al., A Novel Algorithm for Efficient Labeling and Its Application to On-Road Risk Detection, 2019, IEEE Int. Conf. on Dependable, Autonomic and Secure Computing, pp. 1-7. (Year: 2019).*

Macias-Garcia et al., CNN Based Perception System for Collision Avoidance in Mobile Robots using Stereo Vision, 2020, Int. Joint Conference on Neural Networks, pp. 1-8. (Year: 2020).*

* cited by examiner

SYSTEMS AND METHODS FOR CONSTRUCTION ZONE DETECTION

BACKGROUND

Various vehicle systems and techniques are utilized to perform detection of features in environments and classification of such features for purposes of determining vehicle control operations and performing other actions. For example, autonomous vehicles may be configured with various types of sensor systems (e.g., lidar, radar, sonar, vision, etc.) that may be used to detect and classify drivable and/or non-drivable surfaces in an environment. Such sensor systems may also detect objects in the environment (e.g., pedestrians, other vehicles, obstacles, etc.). Based on these detected surfaces and/or objects, an autonomous vehicle may determine a route and/or trajectory through an environment and/or controls that may be used to safely navigate the vehicle through the environment. Surfaces on which a vehicle may typically be safely operated may occasionally be unsafe or unavailable for vehicle operation for various reasons. For example, a section of a road may be under repair by a road construction crew or blocked off by authorities. It may, at times, be challenging to accurately detect and navigate a vehicle around such sections of normally drivable road surfaces.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
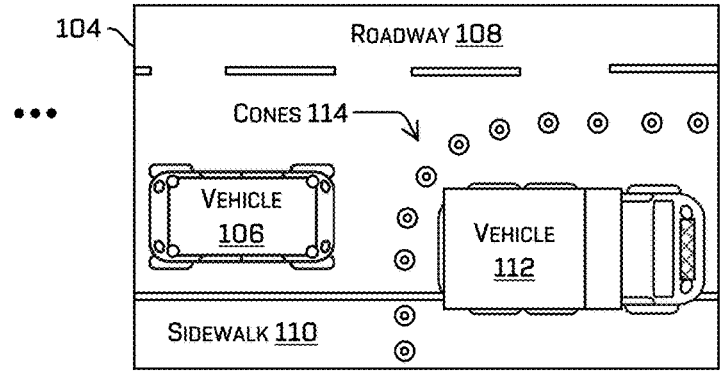
FIG. 1 is a pictorial flow diagram of an example process for determining construction zone classifications for two-dimensional image data, in accordance with examples of the disclosure.
Figure 1:
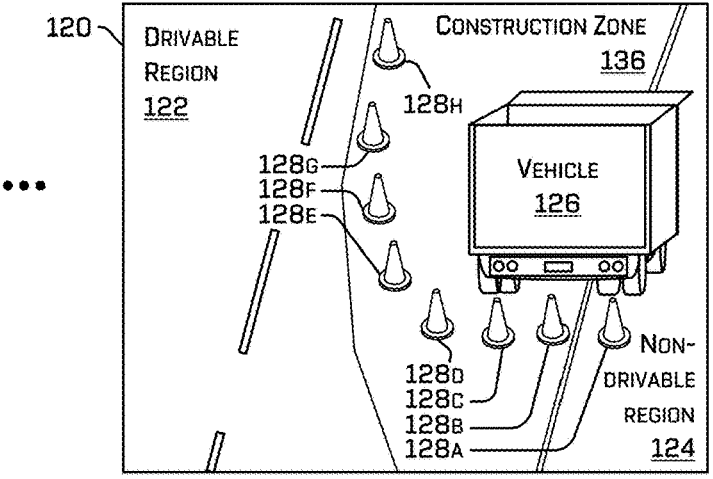
Figure 1:
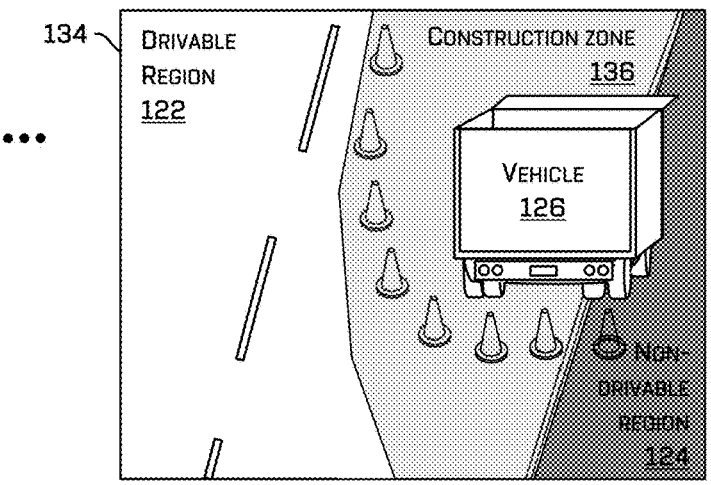

Techniques for improving the detection and classification of construction zones in an environment discussed herein may include using two-dimensional sensor viewpoint representations of an environment to identify and classify construction zones and other features of an environment. The disclosed techniques may also include integrating construction zone classifications represented in two-dimensional representations into vehicle computing system components and processes to perform various operations related to vehicle control. The disclosed techniques may further be used to improve the training of a machine-learned model to detect and classify construction zones using training data that includes representations of various other types of classified features and/or labeled objects. The model may then be used, for example in conjunction with sensor and/or perception systems and/or other classification systems and/or components, to detect and label construction zones in a real-world environment in which a vehicle may be traveling.

An environment in which a vehicle may be traveling may include various types of surfaces, regions, and/or areas. For example, an environment may include one or more drivable regions that may be designed and available to be driven upon by passenger and/or cargo vehicles, such as a road, highway, street, driveway, parking lot, etc. An environment may also, or instead, include one or more non-drivable regions that may be designed for non-vehicle use and/or use by vehicles that are not passenger and/or cargo vehicles (e.g., bicycles, golf carts, etc.), such as a sidewalk, lawn, park, bike path, cart path, foot path, trail, etc. A normally drivable surface or region may become a non-drivable region due to an event or condition, for example, when such a region is under construction or repair, cordoned off for an event, closed off due to an emergency, etc. Furthermore, a future drivable region may currently be a non-drivable region due to the region currently being under construction. It may be difficult or impossible to predict when and for how long a portion of a normally drivable region may become non-drivable due to an event or condition. A primary, and often only, indication that a portion of a drivable region is currently non-drivable may be the local presence of visual indicators, such as road cones, barrels, construction workers, construction equipment, etc. As used herein, a previously or future drivable region that is currently non-drivable may be referred to generally as a "construction zone," although this term may of course refer to any portion of an environment that may have been and/or will be drivable but is currently non-drivable, regardless of the reason.

An environment in which a vehicle may be traveling may also include one or more other types of objects and/or features. For example, other vehicles may be traveling through the environment, including typical passenger and cargo vehicles and/or other types of vehicles, such as bicycles. Pedestrians may be present in the environment along with animals (e.g., pets and/or wildlife). Stationary objects, such as buildings, street signs, traffic signals, lane markings, etc., may also, or instead, be present in such an environment. A vehicle operating within such an environment may be equipped with one or more sensor systems that allow the vehicle to collect data from the environment. The vehicle may use this data to categorize and/or label the objects and features in the environment in order to safely navigate the vehicle through the environment. However, these labeling and classification operations may be challenging due to the number of objects, regions, and features that may require labels. A further challenge is that one portion of the environment may correspond to multiple labels. For instance, a section of road under construction may qualify as both a drivable region and a construction zone, while a sidewalk proximate to that section of road and also under construction may qualify as a non-drivable region and a construction zone.

The techniques described herein may improve the accuracy of construction zone determinations for use in the operation of a vehicle. The techniques described herein may also improve the accuracy of distinctly labeling construction zones and objects and regions proximate to such zones by one or more machine-learned models trained and/or executed according to the disclosed examples.

When a construction zone label is over-applied (e.g., applied to portions of a representation of an environment that are not actually non-drivable due to construction), an autonomous vehicle may be controlled to stop unnecessarily or move about a much larger area than necessary to avoid the actual region of construction. Alternatively, when a construction zone label is under-applied (e.g., not applied to portions of a representation of an environment that are actually non-drivable due to construction), an autonomous vehicle may be in risk of driving into a construction zone and creating a poetically hazardous condition. Thus, accurate classification of such zones is related to safe operation of the vehicle balanced with efficient movement of the vehicle through an environment. The disclosed techniques improve labeling of construction zones to a high degree of accuracy to support autonomous vehicle operations. The disclosed techniques can also improve the accuracy of labeling of object detection, image segmentations, and/or image pixels to support autonomous vehicle operations. "Detection" and "segmentation" may be used herein to describe any portion of an image associated with a particular object, feature, or other aspect of environment and any data associated with such an object, feature, or aspect.

In various examples, a vehicle computing system may receive sensor data from one or more sensors configured at a vehicle. Such a vehicle may be configured with one or more sensor systems (lidar, radar, sonar, cameras, time-of-flight, etc.). These sensors systems may include emitters configured to emit electromagnetic radiation (e.g., light, sound, lasers, etc.) or other types of emissions into an environment and/or detect electromagnetic radiation and/or other emissions present in the environment (e.g., reflected from surfaces in the environment and/or emitted from objects in the environment). These sensor systems may generate or otherwise determine sensor data based on the detected emissions in the environment and provide this sensor data to the vehicle computing system. Using this sensor data, the vehicle computing system may determine or generate two-dimensional images, three-dimensional data, and/or scenes representing the environment. Such images may represent a portion of the environment as viewed or perceived from the point of view of the sensor. For example, an image may represent a picture of the environment as captured by a camera configured at the vehicle. However, any type of sensor data or combination of various types of sensor data may be used to generate one or more images representing a portion of an environment captured from any perspective.

The vehicle computing system may use one or more feature classification components to label or otherwise categorize objects, features, and/or regions represented in a two-dimensional image representing a portion of the environment. In some examples, the vehicle computing system may generate a feature labeled image that includes this labeling information. In such examples, individual pixels of the image may be assigned a respective label associated with the object, feature, regions, etc. represented by that pixel. Labels may be determined based on a variety of factors, such as confidence factors. For example, a particular pixel may be associated with a candidate object label with a confidence factor indicating an 60% confidence that the associated pixel represents an object and a candidate drivable region label with a confidence factor indicating an 95% confidence that the associated pixel represents a drivable regions. The system may determine a label for this particular pixel based on these confidence factors by, for example, selecting the label with the highest confidence (in this example, a drivable region label). In various examples, the system may store or otherwise associate a determined confidence factor with the pixel and/or label for, for example, for use as a significance factor in determining whether the pixel may be labeled with a construction zone label as described herein.

The vehicle computing system may also, or instead, use a construction zone classification component to label or otherwise categorize construction zones in the image. In various examples, a construction zone classification component may use available two-dimensional and/or three-dimensional classification data to label or otherwise categorize construction zones in the image. Such legacy labeled data may be available from prior generated datasets that may use differing techniques to label construction zones (e.g., via a three-dimensional bounding box). For example, a vehicle computing system may use three-dimensional data determined based on the sensor data received from the vehicle's sensor systems to determine three-dimensional boxes or sections representing construction zones in the three-dimensional space of the environment. For training the disclosed two-dimensional classifier/segmenter, three-dimensional bounding boxes may be overlaid onto two-dimensional image(s) representing portion(s) of the environment from a perspective view of a corresponding imaging sensor. For example, log data may include unified and/or three-dimensional scene data as well as corresponding perspective views from imaging sensors that may include raw sensor data and/or data labeled but without construction zone labels. The vehicle computing system may then assign a construction zone label to the portions of the image corresponding to the three-dimensional sections representing construction zones. Examples of generating and utilizing log data that may include unified and/or three-dimensional scene data and perspective views are provided in U.S. patent application Ser. No. 16/219,623, filed Dec. 13, 2018, entitled "Device Message Framework," the entirety of which is incorporated herein by reference for all purposes In some examples, a construction zone labeled image may be generated or otherwise determined that includes construction zone labeling information determined manually (e.g., by a human user) and/or using one or more other operations. In such examples, individual pixels of the image may be assigned a respective construction zone label associated with the construction zone represented by that pixel. In examples, these techniques may be used to label ground truth data in a binary construction zone and/or non-construction zone fashion. This construction zone labeled ground truth data can then be segmented into various labels (e.g., drivable surface, non-drivable surface, static object, dynamic object, etc.). Training a two-dimensional segmentation/classification model without these features may lead to overfitting of data and/or poor boundary definitions.

The vehicle computing system may then perform an intersection operation using the feature labeled image and the construction zone labeled image to determine a labeled output image. For example, the vehicle computing system may compare the labels of individual pixels of the images to determine a label to assign to that pixel in the labeled output image. To make this determination, the vehicle computing system may use a hierarchical labeling process based on the significance of the potential labels for the individual pixel. In some cases, significance may be represented by one or more significance factors that may be based on one or more of various criteria, such as one or more object detection and/or image segmentation properties, attributes, or characteristics (e.g., attributes of the object, region, feature, surface, etc. associated with the detection or segmentation associated with a pixel). For example, the system may determine whether a pixel is associated with a detection that is associated with a drivable or non-drivable region. The system may also, or instead, determine a risk or risk probability (e.g., potential collision probability associated with the portion of the environment represented by the pixel) associated with the detection that may be associated with the pixel. In some examples, label significance redundancy may be used a criteria for label selection. For example, a pixel may represent a road cone that is in a construction zone. Because a road cone may be necessarily associated with a construction zone, the system may label pixels representing road cones and/or other objects associated with constructions zones (e.g., road construction equipment, barrels, rubble, holes, etc.) as construction zone pixels. Alternatively, the system may be configured to determine that a road cone, as a hazardous condition indicator, should be labeled as a road cone even if the road cone is also associated with a construction zone.

In various examples, label confidence factors may be used as significance factors to determine a label for a pixel in an output image. Individual labels associated with a particular pixel and/or detection may have associated confidence factors. For example, a particular drivable region label may be associated with a confidence factor indicating an 80% confidence that the associated pixel or detection represents a drivable region, a particular construction zone label may be associated with a confidence factor indicating a 60% confidence that the associated pixel or detection represents a construction zone, a particular non-drivable region label may be associated with a confidence factor indicating a 50% confidence that the associated pixel or detection represents a non-drivable region, etc. The confidence factors for two or more labels associated with an individual pixel may be used, at least in part, in a determination of whether to use a construction zone label for that pixel. For example, a pixel that has a construction zone label associated with a confidence factor indicating a 95% confidence that the associated pixel or detection represents a construction zone and a non-drivable region label associated with a confidence factor indicating a 30% confidence that the associated pixel or detection represents a non-drivable region may be determined to be associated with a construction zone label in an output image based on these confidence factors.

In an example, if a pixel is labeled as representing a drivable region in the feature labeled image and as representing a construction zone in the construction zone labeled image, the vehicle computing system may determine to use a construction zone label for that pixel in the labeled output image to ensure that the vehicle does not attempt to drive in that region. In another example, if a pixel is labeled as representing a sidewalk region in the feature labeled image and as representing a construction zone in the construction zone labeled image, the vehicle computing system may determine to use a sidewalk label for that pixel in the labeled output image because the region represented by that pixel is not drivable under either label (e.g., the system may select the initial feature label if the risk is the same for both labels). In another example, if a pixel is labeled as representing another vehicle in the feature labeled image and as representing a construction zone in the construction zone labeled image, the vehicle computing system may determine to use a vehicle label for that pixel in the labeled output image because the region represented by that pixel is associated with a potential collision hazard (e.g., the system may select the initial feature label if it is associated with equal or higher risk than a construction zone label). By selecting a label for objects associated with higher risk that may otherwise be occluded by a construction zone, the vehicle computing system may ensure that such objects are not occluded from detection while otherwise ensuring that construction zones are accurately identified.

In various examples, the system may determine whether a label of a pixel is associated with a drivable region in the feature labeled image as a criteria for determining whether to assign a construction zone label to that pixel if it is so indicated in a construction zone labeled image. For instance, the system may first determine whether any pixel associated with a construction zone label is also associated with a non-drivable region label and, if so, refrain from further evaluation of that pixel's label because the pixel is not associated with a region that would be drivable regardless of label. If the pixel is associated with both a construction zone label and a label that may indicate a drivable region, object, potential obstacle, etc., then the system may perform further evaluation to determine whether to label that pixel as a construction zone pixel or other feature. By determining construction zone labeling only for pixels associated with drivable regions, model performance may be improved by reducing unnecessary processing of pixels associated with non-drivable regions (e.g., that are non-drivable regardless of whether such regions are associated with a construction zone or not).

In some examples, the vehicle computing system may assign a single label to an individual pixel as described above. In other examples, the vehicle computing system may assign more than one label to an individual pixel. For example, where a pixel is associated with both a construction zone and a drivable roadway, the vehicle computing system may retain or otherwise associated both corresponding labels to that pixel. By using multiple labels for individual pixels, the vehicle computing system may make this label data available for other systems (e.g., a construction zone label may be used by a trajectory determination system for short distance trajectory determination, while a drivable roadway label may be used by a route planning system for longer distance route generation).

The vehicle computing system may also, or instead, perform other operations to determine additional data that may be included in or otherwise associated with the labeled output image. For example, the vehicle computing system may perform one or more instance segmentation operations to determine a direction value to assign to individual pixels in the output image. The vehicle computing system may also, or instead, perform one or more (e.g., monocular) depth operations to determine a depth value to assign to individual pixels in the output image. The vehicle computing system may also, or instead, perform one or more occlusion and/or truncation determination operations to determine an occlusion and/or truncation value to assign to individual pixels in the output image.

The labeled output image may be used to train a machine-learned construction zone detection model and/or by a vehicle computing system to perform further operations that may, for example, be associated with controlling the vehicle. For example, the labeled output image may be "fused" with one or more other labeled images (e.g., associated with one or more other sensors) and/or used in combination one or more such images to determine a resulting output image that may be used to control a vehicle. In such examples, labels for such a resulting output image (e.g., for individual pixels in such an image) may be determined using one or more of the hierarchical labeling techniques described herein. For example, in an image fusion operation, the system may evaluate the labels associated with pixels in separate images (e.g., originating with separate sensors) that represent a same or substantially similar portion of an environment using one or more of the hierarchical labeling techniques described herein to determine a label for a corresponding pixel in the resulting output image.

In examples, the vehicle computing system may further determine two-dimensional bounding boxes for the construction zones represented in the labeled output image. These two-dimensional bounding boxes may be used by one or more other classification, segmentation, planning, prediction, and/or other systems operated by the vehicle computing system.

In various examples, the labeled output image may also, or instead, be provided to a top-down segmentation component to generate a top-down representation of the environment that includes the construction zone(s) identified in the labeled output image. This top-down representation may then be used by, for example, a prediction component configured at the vehicle to more accurately predict object trajectories and other aspects of objects present within the environment, which in turn may increase the safety and efficiency of vehicle operation.

In various examples, a system may train a machine-learned model to perform construction zone detection and labeling using a training dataset that includes data representing detections of various types based on sensor data collected in an environment. For example, the dataset may include one or more multichannel data structures where individual channels of the data structure may represent data associated with a particular type of sensor or particular sensor system (e.g., vision, lidar, radar, sonar, time-of-flight, etc.). In examples, individual channels of the data structure may also, or instead, represent data associated with a particular individual sensors or sensor systems (e.g., that may be used in a fusion process as described herein). Examples of processing multichannel data structures and/or data associated with multiple sensors and other data sources to determine environmental information are provided in U.S. patent application Ser. No. 16/941,815, filed Jul. 29, 2020, now U.S. Pat. No. 11,361,196, issued Jun. 14, 2022, entitled "Object Height Estimation from Monocular Images," and U.S. patent application Ser. No. 17/520,496, filed Nov. 5, 2021, entitled "Sensor Perturbation," the entireties of both of which are incorporated herein by reference for all purposes.

In some examples, the training dataset may also, or instead, include one or more images or other two-dimensional representations of an environment based on one or more types of sensor data. The sensor data used to determine such images may or may not be included in the training dataset (e.g., as one or more multichannel data structures). Such images may represent a particular two-dimensional perspective "view" of the environment representing data captured from the perspective of a particular sensor or set of sensors (e.g., an image captured by a camera, a two-dimensional representation of lidar data captured by a lidar sensor, a two-dimensional representation of radar data captured by a radar sensor, a two-dimensional representation of sonar data captured by a sonar sensor, any combination of these, etc.). The images or two-dimensional representations of the environment in a training dataset may include or be associated with one or more labels. For example, individual pixels in such images and/or individual detections and/or segmentations in training data may be associated with one or more labels. Such labels may indicate that a pixel, detection, or segmentation is associated with a particular type of object, feature, or region (e.g., drivable road, sidewalk, pedestrian, vehicle, bicycle, dog, bird, etc.). In some example, the training data may also include construction zone labels for one or more pixels, detections, or segmentations. In some examples, an individual pixel may be associated with two or more labels as described herein (e.g., a construction zone label and a drivable roadway label). Other data may also be associated with the individual pixels and/or the images included in the training dataset, such as direction data, depth data, occlusion data, and/or truncation data.

The training data may then be used to train a machine-learned construction zone detection and classification model. Such a model may be executed at a vehicle computing system to perform construction zone detection and classification as described herein. Output from such a model may also, or instead, be used as further training data. For example, a model may be executed using training data to generate output data that may then be used as input training data to further train the model.

As described herein, the output data determined using the disclosed techniques, including images, pixels, and associated labels, may be used to train one or more machine-learned models to preform various operations. For example, the labeled image data determined herein may be used as training data to improve the operations performed by a machine-learned model for identification and classification of construction zones. Examples of training a machined-learned model and performing a labeling process are provided in U.S. patent application Ser. No. 17/215,938, filed Mar. 29, 2021, entitled "Hierarchical Machine-Learning Network Architecture," the entirety of which is incorporated herein by reference for all purposes.

When a machine-learned model trained according to the disclosed techniques is executed in a vehicle computing system, the model may perform construction zone determinations and labeling that may be used to control the vehicle. For example, based on construction zone determinations and labeling, the vehicle computing system may determine a vehicle trajectory that addresses the presence of the construction zone when planning a vehicle trajectory or adjusting a vehicle trajectory. Additionally or alternatively, the labeled images generated using the disclosed technique may be provided to a planning component of the vehicle and/or used to generate a top-down segmented representation of the environment that may be provided to such a planning component. In such an example, the planning component may use these images, labels, and/or associated data in determining a trajectory for the vehicle.

In examples, during inference mode data from multiple two-dimensional imaging sensors can be fused into a unified representation of a scene. Segmented and/or labeled images including construction zone labels can be output from each of multiple two-dimensional imaging sensors using the disclosed techniques. Fusing the output from the two-dimensional sensors into a unified space may include representing the unified space as a top-down multichannel imagine that may include data from other sensors. The top-down multichannel image may include construction zone labels for pixels contained therein that are determined from each of the two-dimensional imaging devices. When combining data from multiple two-dimensional imaging devices, there may be competing labels assigned to pixels of the unified space (e.g., when one label from a first camera disagrees with a label from a first camera for the corresponding pixel). In such instances, the hierarchical labeling techniques disclosed herein may be used to determine appropriate label(s) to ultimately assign to the unified space. For example, a construction label may take priority over other labels to enhance safety of a vehicle. In still other examples, conflicting labels may be resolved via a confidence metric wherein a confidence score per label may be assigned and averaged. In examples, a weighting can be used for certain cameras wherein. Examples of top-down segmentation and other segmentation operations are provided in U.S. patent application Ser. No. 15/963,833, filed Apr. 26, 2018, now U.S. Pat. No. 10,649,459, issued May 12, 2020, entitled "Data Segmentation using Masks," the entirety of which is incorporated herein by reference for all purposes.

In various embodiments, during inference mode and/or in the performance of fusion operations, conflicting labels may be resolved for a unified representation of the environment based on a variety of criteria. For example, confidence values associated with the labels that may be associated by different sensor systems with a pixel in the unified space may be used to determine the label for that pixel in the unified space (e.g., assign the label with the highest confidence value to that pixel). In another example, a particular hierarchy may be applied similar to that described herein, where a more significant label may be assigned or less significant label (e.g., based on potential risk or increased safety). For instance, a dynamic object may be selected over a construction zone label, while a construction zone label may be selected over a drivable region label. In another example, particular labels may be weighted based on various criteria (e.g., labels associated with potential risks or safety conditions may weighted higher than others). In other examples, labels may be averaged to determine a particular label for a pixel in unified space. This averaging may take into account weighted and/or unweighted confidence values of candidate labels in determining a label to assign to a pixel in unified space. In examples, such weighting may be based on which camera likely has the best field of view based on its location and orientation on a vehicle and/or the relative location of the construction zone portion corresponding to the respective pixel from each camera.

In various examples, a remote operator or remote system may also, or instead, be contacted by a vehicle computing system in response to a construction zone determination. For example, the vehicle computing system may provide to a remote operator or remote system data representing construction zone determinations and labeling, as well as, in some examples, associated data (e.g., images, detections, other labeling data, etc.). This may allow a remote operator to control the vehicle in the vicinity of a construction zone and/or collect data associated with construction zones.

The systems and techniques described herein may be directed to training, executing, and leveraging machine-learned models, sensor data, and associated data to improve construction zone and other types of detection used by a vehicle, such as an autonomous vehicle, in an environment. More specifically, the disclosed systems and techniques may be directed to facilitating more accurate detection of construction zones and reducing false designations of otherwise drivable regions as construction zones. Using this improved data, such a vehicle may generate safer and more efficient trajectories for use in navigating through an environment. In particular examples, the systems and techniques described herein can utilize various types of sensor data and/or images in training datasets to train machine-learned models to more accurately and efficiently determine whether regions in an environment are construction zones. By using these models trained according to the disclosed examples, vehicle computing systems may more accurately distinguish between construction zones that may not be drivable (and may even present a hazard to an autonomous vehicle) and drivable regions in the environment that may be safely traversed. The examples described herein may result in increased certainty and accuracy in construction zone and other region type detections, thereby allowing an autonomous vehicle to generate more accurate and/or safer trajectories for the autonomous vehicle to traverse in the environment.

For example, techniques described herein may increase the reliability of the determination of types of regions in the environment, reducing the likelihood of inaccurately designating a region as construction zone or as a drivable region. That is, the techniques described herein provide a technological improvement over existing region detection and/or classification technology and vehicle tracking and/or navigation technology. In addition to improving the accuracy of construction zone detections and classifications of such zones, the systems and techniques described herein can provide a smoother ride and improve safety outcomes by, for example, more accurately providing safe passage to an intended destination through an environment that includes one or more construction zones. Moreover, the systems and techniques may prevent unnecessary braking or hard-braking to avoid drivable regions that have been inaccurately labeled as construction zones and that can safely be passed through.

The techniques described herein may also improve the operation of computing systems and increase resource utilization efficiency. For example, computing systems, such as vehicle computing systems, may more efficiently perform construction zone determinations using one or more machine-learned models trained according to the techniques described herein because, by auto-labeling construction zones using such a model, the disclosed examples may reduce the amount of manual labeling required to generate subsequent training datasets. The disclosed examples may also reduce the data processing required to determine and label construction zones because the machine-learned models trained according to the disclosed examples may increase the accuracy of such determinations, thereby reducing the need to correct and/or adjust labeling by other systems and processes (e.g., manually or by other components) associated with a vehicle computing systems. This reduction in extraneous processing therefore increases the overall efficiency of such systems over what would be possible using conventional techniques. Moreover, the techniques discussed herein may reduce the amount of data used by computing systems to determine and process construction zone labels as the number of labels applied to various pixels may be reduced due to improved accuracy of labeling, which may reduce latency, memory usage, power, time, and/or computing cycles required to detect and categorize construction zones in an environment.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, any one or more of various types of sensors and emitters are contemplated, as well as various types of sensor data (e.g., lidar, sonar, radar, vision). Furthermore, the disclosed systems and techniques may include using various types of components and various types of data and data structures, including, but not limited to, various types of image data and/or sensor data (e.g., stereo cameras, time-of-flight data, radar data, sonar data, vision data, lidar data, and the like). For example, the techniques may be applied to any such sensor systems. Additionally, the techniques described herein can be used with real data (e.g., captured using sensor(s)), simulated data (e.g., generated by a simulator), or any combination of the two.

Figure 3:
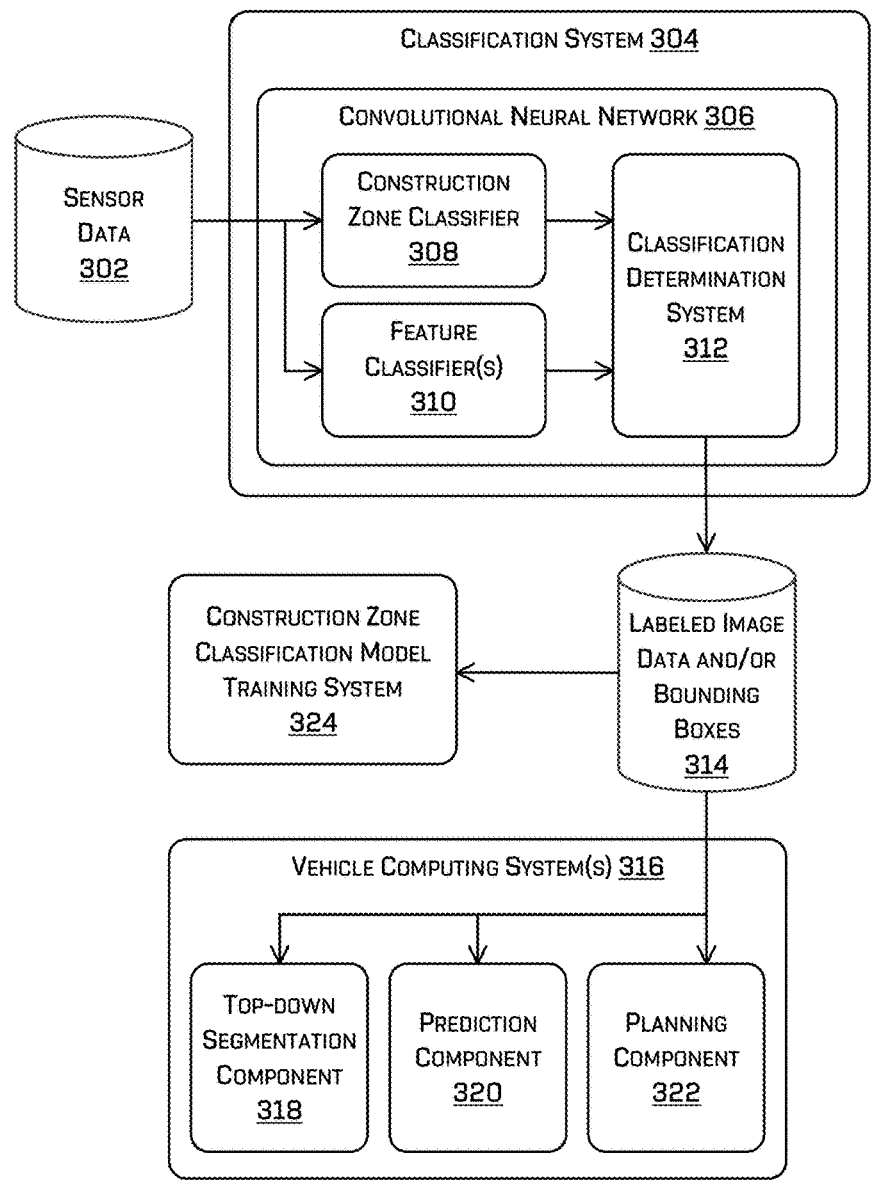
FIG. 3 is a block diagram of an example construction zone classification system, in accordance with examples of the disclosure.

FIG. 1 is a pictorial flow diagram of an example process 100 for detecting and labeling construction zones in an environment in which a vehicle may be operating and/or for determining training data that may be used to train a machine-learned model to detect and label construction zones. In some examples, one or more operations of the process 100 may be implemented by a vehicle computing system, such as by using one or more of the components and systems illustrated in FIGS. 3-5 and described below. For example, one or more components and systems can include those associated with one or more of the classification system 304, the classifiers 308 and 310, the classifier(s) 408, the classification component 524, the construction zone classification component 526, one or more sensor systems 404 and 506, one or more of the perception components 406 and 522, and/or one or more of the planning components 418 and 528. In some examples, the one or more operations of the process 100 may also, or instead, be performed by a remote system that may be in communication with a vehicle, such as the classification component 546, the construction zone classification components 548, the perception component 544, and/or the planning component 550 of the computing device(s) 538 illustrated in FIG. 5. In some examples, the one or more operations of the process 100 may also, or instead, be performed by a remote system that may be configured to train a machine-learned model, such as the construction zone classification model training system 552 illustrated in FIG. 5. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 3-5 are not limited to performing the process 100.

At operation 102, sensor data representing an environment in which a vehicle may be traveling may be received at a vehicle computing system or other computing system. For example, the system performing the operations of process 100 may be a system for executing and/or training one or more machine-learned models and/or for generating training data for use in training a machine-learned model. In particular examples, this sensor data may include one or more types of sensor data associated with one or more types of sensor systems, including, but not limited to, vision data associated with a vision system, lidar data associated with a lidar system, radar data associated with a radar system, sonar data associated with a sonar system, etc. In various examples, the sensor data may include two-dimensional representations of a portion of an environment determined based on sensor data and associated with a particular sensor perspective. For example, such two-dimensional representations may include images or scenes captures by a camera configured at a vehicle (e.g., a "two-dimensional sensor perspective image"). While referred to herein generally as "images," any two-dimensional representation of an environment described herein may be associated with any sensor perspective and may be generated or otherwise determined using any type of sensor data and/or any combination of multiple types of sensor data.

An example 104 illustrates a top-down view of a portion of an environment that may be represented by sensor data such as that received at operation 102. In the portion of the environment represented in example 104, a vehicle 106 may represent a vehicle associated with such sensor data (e.g., a vehicle that may have collected, generated, and/or received the sensor data) and that may be traveling through that portion of the environment. A vehicles 112 may also be within this portion of the environment, as well road cones 114. This portion of the environment may include a drivable region in the form of a roadway 108 and a non-drivable region in the form of a sidewalk 110.

At operation 116, the vehicle computing system may determine one or more two-dimensional representations (e.g., images) of the portion of the environment associated with the sensor data received at operation 102. In some examples, the vehicle computing system may receive such images with the sensor data at operation 102. Alternatively or additionally, the vehicle computing system may generate or otherwise determine such image based on the sensor data received at operation 102.

Further at operation 116, the vehicle computing system may determine one or more labels for individual features, objects, regions, and/or other detections represented in such images. Examples of such labels may include object labels (e.g., vehicle, bicycle, pedestrian, dog, bird, obstacle, etc.) and region labels (e.g., drivable region, non-drivable region, construction zone, etc.). The vehicle computing system may assign these one or more labels to such detections and/or otherwise associate label data with such detections.

In various examples, the images processed by the vehicle computing system may include a number of discrete pixels. The vehicle computing system may determine a detection associated with individual pixels and may then determine one or more labels for such individual pixels based on the associated detection. The vehicle computing system may associate such labels with the individual pixels. For example, the individual pixels associated with a drivable roadway may be individually assigned a drivable region label. Similarly, the individual pixels associated with a vehicle may be individually assigned a vehicle object label. In some examples, an individual pixel may be associated with a single label. In other examples, an individual pixel may be associated with multiple labels. For example, a pixel that is associated with a drivable roadway that is under construction may be assigned a drivable region label and a construction zone label. The vehicle computing system may use such labels to determine labels for individual pixels for a labeled output image as described herein.

In various examples, as described in more detail herein (see, e.g., FIG. 2 and accompanying description), at operation 116 the vehicle computing system may determine two or more intermediate images and/or associated labels that may then be used to determine construction zone labeling for an output image. For example, at operation 116, the vehicle computing system may determine a non-construction zone labeled image based on a particular image and a construction zone labeled image for that particular image.

The non-construction zone labeled image may include labels for pixels that are not construction zone labels, while the construction zone labeled image may include (e.g., only) construction zone labels for pixels in the image. The non-construction zone labeled image and the construction zone labeled image may be used to determine output image labeling as described below for operation 132 and elsewhere herein.

An example 120 illustrates an example two-dimensional image and associated labeling based on sensor data collected from the environment represented in example 104. This example illustrates both construction zone detections and associated labels as well as non-construction zone detections and associated labels. In this example, the vehicle computing system has determined from the sensor data that the roadway 108 of example 104 is a drivable region 122 and that a portion of the environment is within a construction zone 136. The vehicle computing system has further detected the road cones 114 of the example 104 and labeled those that are represented in the image 120 as cones 128a-h. The vehicle computing system may have also detected and labeled the vehicle 112 from example 104 as vehicle 126 and the sidewalk 110 from example 104 as non-drivable region 124.

At operation 130, the vehicle computing system may next determine labels for individual pixels of one or more output images. In particular, the vehicle computing system may determine, at operation 130, whether pixels associated with a construction zone should be labeled as construction zone pixels.

In various examples, where an individual pixel may be associated with multiple labels, the vehicle computing system may determine at operation 130 one of such multiple labels to associate with the individual pixel in an output image. For example, the vehicle computing system may have assigned both a construction zone label and a drivable region label to particular pixel at operation 116. These two labels may be associated with the particular pixel in a single image or may be associated with pixels corresponding to the particular pixel in distinct images (e.g., a non-construction zone labeled image and a construction zone labeled image). At operation 130, the system may determine, based on one or more criteria, which of one or more labels associated with individual pixels is to be assigned to such pixels in an output image.

The vehicle computing system may use a hierarchical labeling process to determine a label for a particular pixel based on the significance of the labels with that pixel. Label significance may be based on the detection that a particular label represents. In examples, label significance may be based on a risk or risk probability represented by the detection and the vehicle computing system may be configured to select the label representing the highest probability of risk for the vehicle from among those available for a pixel. For example, if a particular pixel is assigned a construction zone label and a drivable region label (e.g., in one image supporting multiple labels per pixel or in two distinct images (e.g., a non-construction zone labeled image and a construction zone labeled image)), the vehicle computing system may determine the construction zone label for that pixel because a construction zone may present a higher probability of vehicle risk than a drivable roadway. In another example, if a particular pixel is assigned a construction zone label and a vehicle label indicating a moving vehicle or some other type of dynamic object (e.g., in one image supporting multiple labels per pixel or in two distinct images), the vehicle computing system may determine the vehicle label for that pixel because a moving vehicle or dynamic object may present a higher probability of vehicle risk (e.g., a risk of potential collision) than a construction zone. In another example, if a pixel is assigned a non-drivable region label and a construction zone label (e.g., in one image supporting multiple labels per pixel or in two distinct images), the vehicle computing system may determine to use the non-drivable region label for that pixel because the region represented by that pixel is not drivable under either label (e.g., the risk is the same for both labels).

In various examples, at operation 130 the vehicle computing system may use a drivable region label as a threshold criteria for determining whether to assign a construction zone label to a pixel if the pixel is associated with a construction zone label. For instance, the system may first determine whether any pixel associated with a construction zone label is also associated with a drivable region label before proceeding to determine whether the pixel is to be assigned the construction zone label in an output image. The vehicle computing system may determine to use a non-construction zone label (if applicable) for a pixel that does not represent a drivable region because the region or other detection associated with that pixel may either represent an area that the vehicle would not traverse (e.g., a non-drivable region) or a detection associated with greater significance than a construction zone (e.g., a pedestrian, vehicle, etc.). If the pixel is associated with both a construction zone label and a drivable region label, then the system may perform a further determination as to whether to label that pixel as a construction zone pixel or other type of detection. Where occlusion data for a pixel may be available and/or determined, the vehicle computing system may select an object label for pixels representing an object that may be occluding a construction zone rather than a construction zone label even though such an object may be in a construction zone from the perspective of the sensor associated with data based on which the image was generated. This may improve safe operation of the vehicle because objects in the environment may be obstacles that pose potential collision risks. By using the object label rather than the construction zone label in such cases, the vehicle computing system may ensure that such objects are not occluded from detection and labeling so that the vehicle may be safely operated in the vicinity of such objects.

At operation 132, the vehicle computing system may generate or otherwise determine output images based on the label determinations performed at operation 130. The vehicle computing system may also, or instead, generate additional data and/or generate a dataset (e.g. including one or more multichannel data structures) based on and/or including a subset of the sensor data received at operation 102. Such output images may include pixels that may be labeled as construction zone pixels and pixels that may be labeled as other types of detections. In some examples, individual pixels in this output image may be associated with one label, while in other examples, individual pixels in the output image may be associated with one or more labels.

An example 134 illustrates an example two-dimensional output image and associated labeling based on the labels and detections of example 120. In this example, the vehicle computing system may have determined, for those individual pixels associated with the construction zone 136, whether such pixels are to be labeled with a construction zone label or with another label type as described herein. For example, the pixels associated with the cones 128a-h may be labeled as construction zone pixels as such cones may be associated with less significance than, or may necessarily represent, a construction zone. The portion of the drivable region 122 that is also within the construction zone 136 may be labeled as construction zone pixels as a construction zone may represent greater significance than a drivable region. The vehicle computing system may have determined the vehicle label 126 for the vehicle in the construction zone as a vehicle may be of greater significance than a construction zone. The vehicle computing system may also, or instead, have determined the non-drivable region label 124 for the sidewalk within the construction zone because a sidewalk is necessarily a non-drivable region regardless of construction status.

At operation 138, the two-dimensional output images with associated labeling that may include construction zone labels may be provided to one or more other systems (e.g., vehicle computing system components) for use in controlling the vehicle. Alternatively or additionally, such output images may be used to train a machine-learning model. For example, a signal may be generated or otherwise output that includes the output resulting from the process 100 as training data to a machine-learned model training system to train a machine-learned model to perform construction zone detections and labeling and/or other detections and/or labeling operations.

In various examples, one or more operations of the process 100 may be omitted and/or other operations may be included in the process 100 that may not be explicitly described herein. All such implementations are contemplated as within the scope of the instant disclosure.

Figure 2:
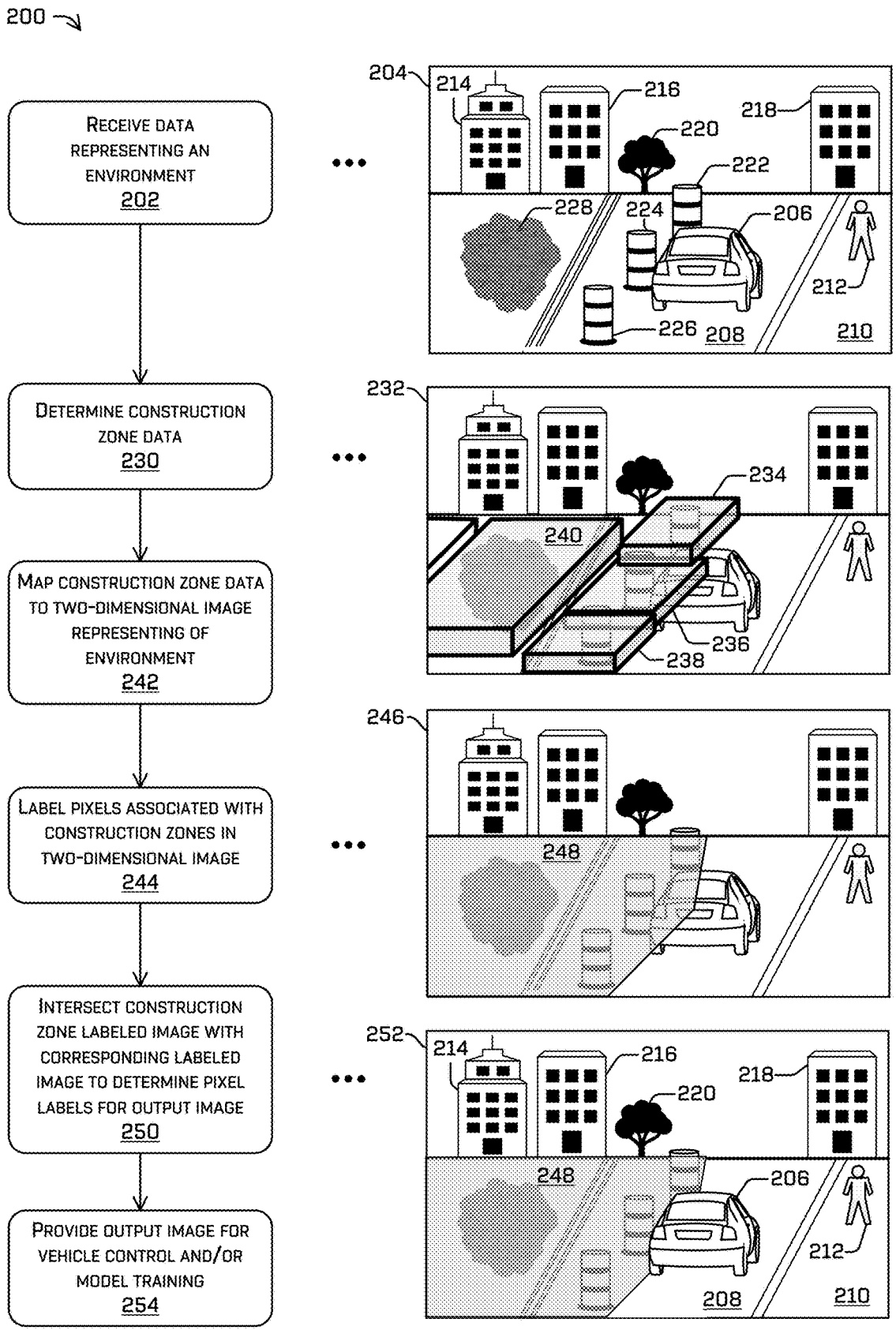
FIG. 2 is a pictorial flow diagram of another example process for determining construction zone classifications for two-dimensional image data, in accordance with examples of the disclosure.

FIG. 2 is a pictorial flow diagram of an example process 200 for detecting and labeling construction zones in an environment in which a vehicle may be operating and/or for determining training data that may be used to train a machine-learned model to detect and label construction zones. In some examples, one or more operations of the process 200 may be implemented by a vehicle computing system, such as by using one or more of the components and systems illustrated in FIGS. 3-5 and described below. For example, one or more components and systems can include those associated with one or more of the classification system 304, the classifiers 308 and 310, the classifier(s) 408, the classification component 524, the construction zone classification component 526, one or more sensor systems 404 and 506, one or more of the perception components 406 and 522, and/or one or more of the planning components 418 and 528. In some examples, the one or more operations of the process 200 may also, or instead, be performed by a remote system that may be in communication with a vehicle, such as the classification component 546, the construction zone classification components 548, the perception component 544, and/or the planning component 550 of the computing device(s) 538 illustrated in FIG. 5. In some examples, the one or more operations of the process 200 may also, or instead, be performed by a remote system that may be configured to train a machine-learned model, such as the construction zone classification model training system 552 illustrated in FIG. 5. Such processes may also, in turn, be performed by the device itself (e.g., using onboard electronics) such that a standalone device may produce such signals without the need for additional computational resources. In still other examples, the one or more operations of the process 200 may be performed by a combination of a remote system and a vehicle computing systems. However, the process 200 is not limited to being performed by such components and systems, and the components and systems of FIGS. 3-5 are not limited to performing the process 200.

At operation 202, data representing an environment in which a vehicle may be traveling may be received at a vehicle computing system or other computing system. For example, the system performing the operations of process 200 may be a system for executing and/or training one or more machine-learned models and/or for generating training data for use in training a machine-learned model.

In particular examples, the data received at operation 202 may include one or more types of sensor data associated with one or more types of sensor systems, including, but not limited to, vision data associated with a vision system, lidar data associated with a lidar system, radar data associated with a radar system, sonar data associated with a sonar system, etc. In some examples, data may be received from a sensor system remote from a vehicle (e.g., a stationary sensor, another vehicle, etc.). In various examples, the data received at operation 202 may also, or instead, include two-dimensional representations of a portion of an environment determined based on sensor data and associated with a particular sensor perspective, such as two-dimensional sensor perspective images. For example, such two-dimensional representations may include images or scenes captures by a camera configured at a vehicle, although of course any two-dimensional representation of an environment described herein that may be associated with any sensor perspective and may be generated or otherwise determined using any type of sensor data and/or any combination of multiple types of sensor data are contemplated. As noted above, any such representation may be referred to herein as an "image."

The data received at operation 202 may further include three-dimensional data representing an environment. For example, such data may include one or more representations of the three-dimensional space in an environment that may be "voxelized" by uniformly dividing the space into three-dimensional cubes ("voxels") representing sections of that portion of the space. The data received at operation 202 may include one or more multichannel data structure that may have multiple (e.g., two, three, four, or more) sensor channels with data associated with any one or more sensor types and/or other types of data, any of which may be associated with one or more particular pixels and/or voxels.

In various examples, the data received at operation 202 may include label data. For example, the images received may include images with labeled pixels. In such examples, these labels may be non-construction zone labels. In other examples, the data received at operation 202 may also, or instead, include unlabeled and/or raw images. In some examples, the data received at operation 202 may also, or instead, include labeled three-dimensional data that may include voxels and labels associated with individual or groups of voxels. The data and/or labels received at operation 202 may be based on any type of sensor data.

An example 204 illustrates a two-dimensional sensor perspective view of a portion of an environment that may be represented by two-dimensional, three-dimensional, and/or other data, such as that received at operation 202. This example perspective view of the environment may represent a view from the perspective of a sensor configured on a vehicle. In this example, the perspective of the sensor may extend outward from the vehicle at which the sensor is configured, and therefore the vehicle at which the sensor is configured may not be captured in the example view 204. In the portion of the environment illustrated in example 204, detections may be represented that may include another vehicle 206 that may be traveling through the environment on a drivable region 208. A non-drivable region 210 (e.g., sidewalk) may be present in the environment on which a pedestrian 212 may be walking. Buildings 214, 216, and 218 and a tree 220 may also be present in this view of the environment. Construction barrels 222, 224, and 226 may also be present in the environment on the drivable region 208. A pile of rubble 228 due to road construction may also be present in the environment and within the drivable region 208. In this example, these objects, features, and regions may be labeled in received data (e.g., at operation 202). Alternatively or additionally, a vehicle computing system may determine one or more labels for such detections using such received data.

At operation 230, the vehicle computing system may determine construction zone data based on the data received at operation 202. In various examples, three-dimensional data received at operation 202 may include one or more labels indicating portions of three-dimensional space in the environment that may be associated with a construction zone or have a relatively high probability of being associated with a construction zone. For example, individual voxels included in such data may be associated with one or more labels, one of which may be a construction zone label. Alternatively or additionally, the vehicle computing system may use received data (three-dimensional data, two-dimensional data, and/or any other data) representing the environment to determine portions of the environment that may be associated with one or more construction zones. For example, the system may receive or obtain manually determined construction zone labeling construction zone labeled resulting from one or more other operations. An example 232 illustrates the sensor perspective view of the portion of the environment shown in example 204. In this example, three-dimensional portions ("boxes") of the environment are illustrated that may have been generated or otherwise determined by a vehicle computing system. The boxes 234, 236, 238, and 240 represent three-dimensional portions of the environment that have been determined to be associated with (e.g., encapsulate or include) a construction zone. As seen in this example, the construction zone boxes capture within their volume the rubble 228 and the barrels 222, 224, and 226 shown in the example 204.

At operation 242, the vehicle computing system may map the determined construction zone boxes and/or other data indicating one or more construction zones to a two-dimensional representation of the environment. In various examples, the vehicle computing system may generate or otherwise determine a two-dimensional image from the data received at operation 202 that corresponds to the three-dimensional data used at operation 230 to determine three-dimensional construction zone boxes. For example, the vehicle computing system may use two-dimensional and three-dimensional data from these operations that are associated in a data structure and/or are associated with sensor data having a same or substantially similar time of capture in the environment. In some examples, the vehicle computing system may project the three-dimensional construction zone boxes onto a two-dimensional image to determine one or more two-dimensional construction zones. In other examples, the vehicle computing system may project two-dimensional construction zone data or other construction zone data onto a two-dimensional image to determine one or more two-dimensional construction zones. One or more other construction zone mapping and/or determination techniques may also, or instead, be used to determine two-dimensional construction zones for an image.

At operation 244, the vehicle computing system may label individual pixels representing construction zone portions of the environment in the image (as determined by mapping the construction zone data to the image) with a construction zone label. As described herein, the vehicle computing system may perform this operation by labeling pixels in a previously unlabeled image and using the resulting construction zone labeled image in conjunction with a non-construction zone labeled image to determine an output image. Alternatively or additionally, the vehicle computing system may perform this operation by labeling pixels in an image that may or may not already be labeled. For example, pixels in an image may individually support associations with multiple labels. In such examples, the vehicle computing system may associate a construction zone label with those pixels that represent construction zone portions of the environment in the image, even if such pixels are already associated with another type of label.

An example 246 illustrates a two-dimensional image representing the sensor perspective view of the portion of the environment shown in the previous examples 204 and 232. In this example, the portions of the image mapped from the three-dimensional construction zone boxes 234, 236, 238, and 240 shown in example 232 are indicated as a construction zone 248. Here, the individual pixels of the example image 246 associated with the construction zone 248 may be labeled with a construction zone label. The remaining pixels may not be labeled. Alternately or additionally, the pixels in the example image 246 may retain their previous labeling and may, where applicable, also be labeled with a construction zone label. As can be seen in this example image, the construction zone 248 may occlude other detections, such as the rubble 228, the barrels 222, 224, and 226, and a portion of the vehicle 206 (objects shown in the example 204). While this may be desirable for construction zone-related objects such as the rubble 228 and the barrels 222, 224, and 226, this may be undesirable for other objects, such as the vehicle 206, as such objects may represent dynamic, moving, and/or increased risk probability objects that a vehicle computing system may detect to safely control a vehicle.

At operation 250, the vehicle computing system may determine the pixel labels for an output image based on the construction zone labeling performed at operation 244 and one or more other labels. In various examples, the vehicle computing system may intersect or otherwise perform a comparison of a construction zone labeled image (e.g., as generated at operation 244) with a non-construction zone labeled image (e.g., as received at operation 202 and/or otherwise determined by the vehicle computing system). In this intersection operation, for individual pixels associated with two or more labels, the vehicle computing system may determine whether to use a construction zone label or a non-construction zone label for the respective pixel based on the significance of the labels (as described herein) and/or using one or more other criteria.

In other examples, the vehicle computing system may intersect or otherwise perform a comparison of a construction zone labels (e.g., as determined at operation 244) with a non-construction zone labels (e.g., as received at operation 202 and/or otherwise determined by the vehicle computing system), for example, where pixels may be associated with multiple labels (e.g., in a single image). This determination of whether to use a construction zone label or a non-construction zone label for the respective pixel in an output image may also be based on the significance of the labels one or more other criteria.

An example 252 illustrates a two-dimensional output image and output image labels representing the sensor perspective view of the portion of the environment shown in the previous examples 204, 232, and 246. In this example, portions of the construction zone 248 are retained as labeled construction zone pixels, but the vehicle 206, for example, is labeled as a vehicle and unoccluded by the construction zone portion 248. The object not in the construction zone 248 are also labeled accordingly with non-construction zone labels, such as buildings 214, 216, and 218, tree 220, pedestrian and 212. Regions that are not included in the construction zone 248 are also labeled accordingly with non-construction zone labels, such drivable region 208 and non-drivable region 210.

At operation 254, the determined two-dimensional output image and/or associated label data (e.g., including construction zone labels) may be provided to one or more other systems (e.g., vehicle computing system components) for use in controlling the vehicle. Alternatively or additionally, the output image may be used to train a machine-learning model. For example, a signal including or representing this output image as training data may be output or otherwise transmitted to a machine-learned model training system to train a machine-learned model to perform construction zone detections and labeling and/or other detections and/or labeling operations.

In various examples, one or more operations of the process 200 may be omitted and/or other operations may be included in the process 200 that may not be explicitly described herein. All such implementations are contemplated as within the scope of the instant disclosure.

FIG. 3 is a block diagram of an example detection and labeling system 300 according to various examples. The system 300 may be implemented at a vehicle (e.g., an autonomous vehicle) by a vehicle computing system and may include one or more of the components and systems illustrated in FIGS. 4 and 5 described below. Alternatively, or in addition, the system 300 may be implemented at a training data generation system and/or a machine-learned model training system. For example, one or more components and systems can include those associated with one or more of the one or more sensor systems 404 and 506, one or more of the perception components 406 and 522, the classifier(s) 408, the construction zone classification component 526, and/or one or more of the planning components 418 and 528. In some examples, the one or more components of the system 300 may also, or instead, be implemented at a remote system in communication with a vehicle, such as the construction zone classification model training system 552, the classification component 546, the construction zone classification component 548, the perception component 544 and/or the planning component 550 of the computing device(s) 538 illustrated in FIG. 5. In still other examples, one or more operations of the system 300 may be implemented as a combination of a components at a remote system and a vehicle computing system. However, the system 300 is not limited to being performed by such components and systems, and the components and systems of FIGS. 4 and 5 are not limited to implementing the system 300.

Sensor data 302 may be generated, determined, received, and/or provided to the system 300. In various examples, such sensor data may be associated with data collected and/or generated by one or more sensors configured on a vehicle that may be traveling through an environment. Sensor data 302 may include lidar data, radar data, sonar data, vision data, infrared data, ultrasonic data, time-of-flight data, etc. Sensor data 302 may also, or instead, include any type of two-dimensional data and/or three-dimensional date that may be associated with an environment. For example, sensor data 302 may include one or more images of one or more portions of an environment (e.g., based on any type of sensor data). Sensor data 302 may also, or instead, include three-dimensional data associated with an environment that includes and/or may be used to determine three-dimensional construction zone data. Sensor data 302 may further include labels and/or labeling information that may be associated with two-dimensional data (e.g., pixels) and/or three-dimensional data (e.g., voxels). Sensor data 302 may include one or more multichannel data structures with individual channels representing data associated with a particular type of sensor or particular sensor system (e.g., vision, lidar, radar, sonar, time-of-flight, etc.) and/or one or more other types of data.

The sensor data 302 may be provided to a classification system 304 that may be configured to determine classifications, categorizations, labels, etc. for various types of data. For example, the classification system 304 may label pixels in two-dimensional images and/or may label portions of two-dimensional representations of an environment.

The classification system may include a convolutional neural network (CNN) 306. The CNN 306 may implement or execute one or more machine-learned models, for example, trained as described herein to detect objects, regions, features, etc. in an environment and determine appropriate labeling for such detections. For example, the CNN 306 may execute a construction zone classifier 308 that may be a machine-learned model trained to determine and label construction zone detections in two-dimensional images as described herein. The CNN 306 may further execute one or more feature classifiers 310 that may be one or more machine-learned models trained to determine and label non-construction zones detections in two-dimensional images as described herein.

In various examples, the construction zone classifier 308 may be a machine-learned model trained using training data that include labeled images (e.g., labeled two-dimensional sensor perspective images). In some such examples, the labeled images may include non-construction zone labels only, while in other examples the labeled images in the training data may also, or instead, include construction zone labels. In particular examples, such training data may include one or more images that include both one or more construction zone labels and one or more non-construction zone labels. In examples, the output data (e.g., labeled output images) generated by the described processes and techniques (e.g., process 100 of FIG. 1, process 200 of FIG. 2) may be used as training data to further train a construction zone detection and classification machine-learned model to perform construction zone detection and classification operations.

In various examples, the construction zone classifier 308 may be configured to detect construction zones in a two-dimensional image using associated three-dimensional data as described herein (e.g., mapping three-dimensional construction zone boxes and/or data to two-dimensional images) and label pixels associated with such construction zones in an image with construction zone labels. In various examples, the feature classifier(s) 310 may perform non-construction zone detections (e.g., object, feature, other types of regions, etc.) and label pixels associated with such non-construction zone detections in an image with corresponding labels.

In various examples, the construction zone classifier 308 may generate or determine a construction zone labeled image and the feature classifier(s) 310 may generate or determine a non-construction zone labeled image. These images may be provided to a classification determination system 312 that may determine a single image based on these two images using pixel label comparison and/or intersection operations as described herein. In other examples, the construction zone classifier 308 may generate or determine a construction zone labels for pixels in an image and the feature classifier(s) 310 may generate or determine a non-construction zone labels for the pixels in that image. This label data may be provided to the classification determination system 312 that may determine a single label for the individual pixels in the image based on the label data using pixel label comparison and/or intersection operations as described herein. The classification determination system 312 may generate the output data 314 that may include labeled image data and/or bounding boxes based on the labeled image data. Such bounding boxes may represent a (e.g., rectangular) boundary of a construction zone that may be used in downstream operations.

The construction zone classifier 308, feature classifier(s) 310, and classification determination system 312 may be integrated into a single machine-learned model executed by the CNN 306. Alternatively, these components may include independently executed models, the outputs of which may be provided to one or more other models to perform the operations described herein.

The output 314 may be provided to the construction zone classification model training system 324 for use in training a model to perform construction zone detection and labeling as described herein.

The output 314 may also, or instead, be provided to the vehicle computing system 316 for further operations that may, for example, be associated with controlling the vehicle. For example, the vehicle computing system may provide the output 314 (e.g., two-dimensional image and label data and/or two-dimensional bounding boxes associated with construction zones) to a prediction component 320 and/or a planning component 322 for trajectory and/or route determination.

In various examples, the vehicle computing system may provide the output 314 to a top-down segmentation component 318 that may generate a top-down segmented representation of an environment that includes indications of one or more construction zones identified in the output 314. The top-down segmentation component 318 may use the two-dimensional image data in the output 314 to determine segment data for a two-dimensional top-down representation of the environment. In some examples, the top-down segmentation component 318 may determine labels for segments in a top-down representation of the environment based on the output 314. In various examples, the top-down segmentation component 318 may represent such segments as connected cells in a top-down two-dimensional grid representation of the environment based, at least in part, on the output 314. This top-down segmented representation may be used by the prediction component 320, the planning component 322, and/or by one or more other components configured at the vehicle computing system 316 to more accurately predict object trajectories and plan vehicle routes and trajectories, which in turn may increase the safety and efficiency of vehicle operation.

The output 314 may be provided to one or more other systems or components for use in other operations, including in combination with other types of data (e.g., using one or more data fusion operations with one or more other images). For example, the output 314 may be used to determine tracking data for objects in an environment and/or the vehicle itself. In various examples, a vehicle computing system 316 may use the output 314 to control a vehicle. For example, a vehicle computing system 316 may determine to slow down the vehicle when approaching a construction zone represented in the output 314 or may determine a trajectory to control the vehicle around a construction zone represented in the output 314.

The output 314 may also, or instead, be provided to one or more other systems or components as training data for training a machine-learned model to, for example, detect construction zones and label two-dimensional images.

Figure 4A:
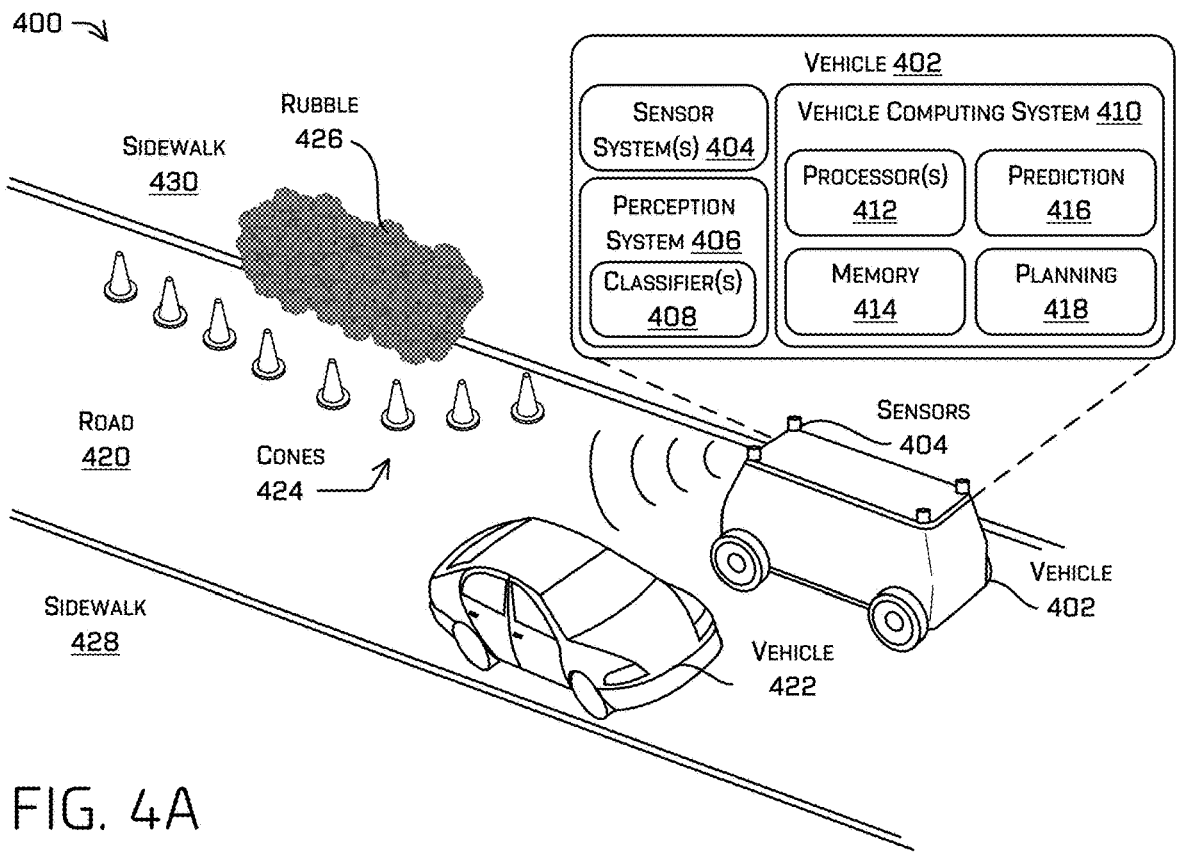
FIG. 4A is a diagram of an example environment in which a vehicle may encounter a construction zone, in accordance with examples of the disclosure.
Figure 4B:
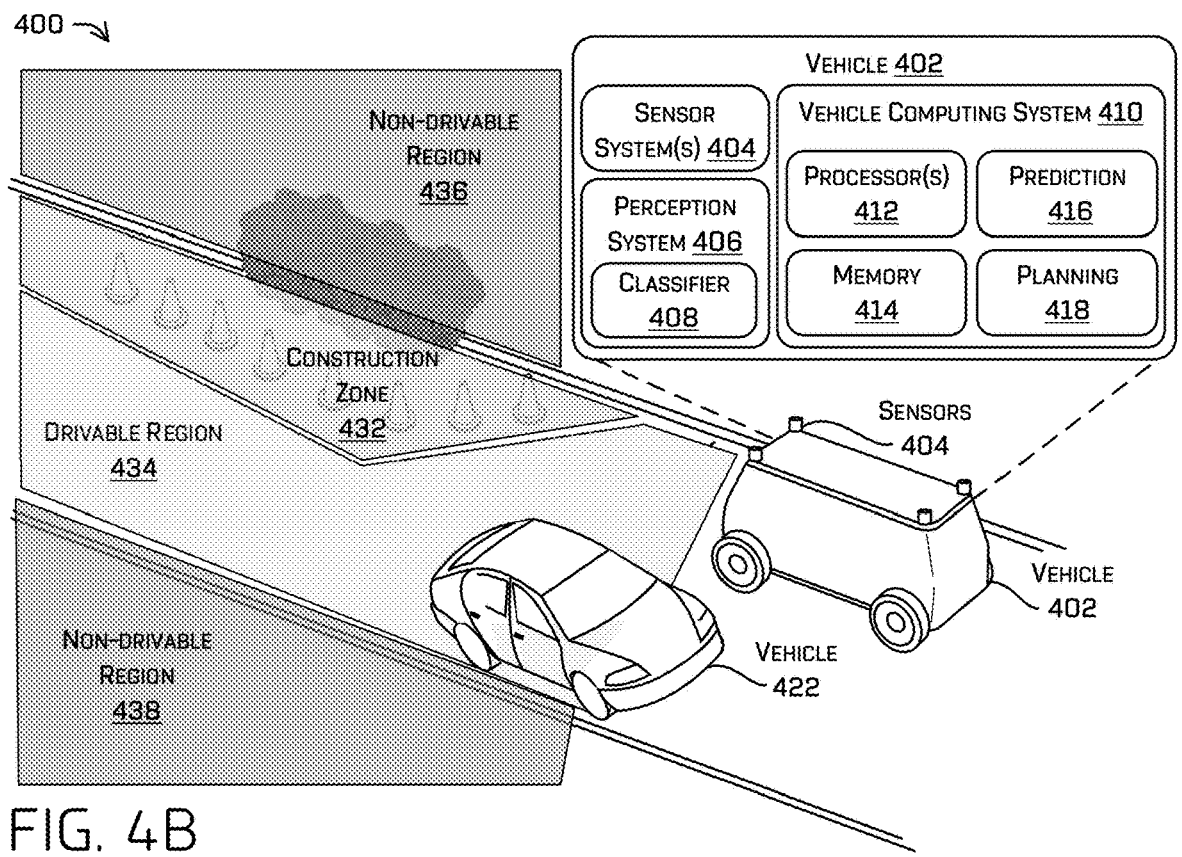
FIG. 4B is a diagram of the example environment of FIG. 4A in which the vehicle may determine a classification for construction zone and other areas of the environment for purposes of navigating the vehicle through the environment, in accordance with examples of the disclosure.
Figure 5:
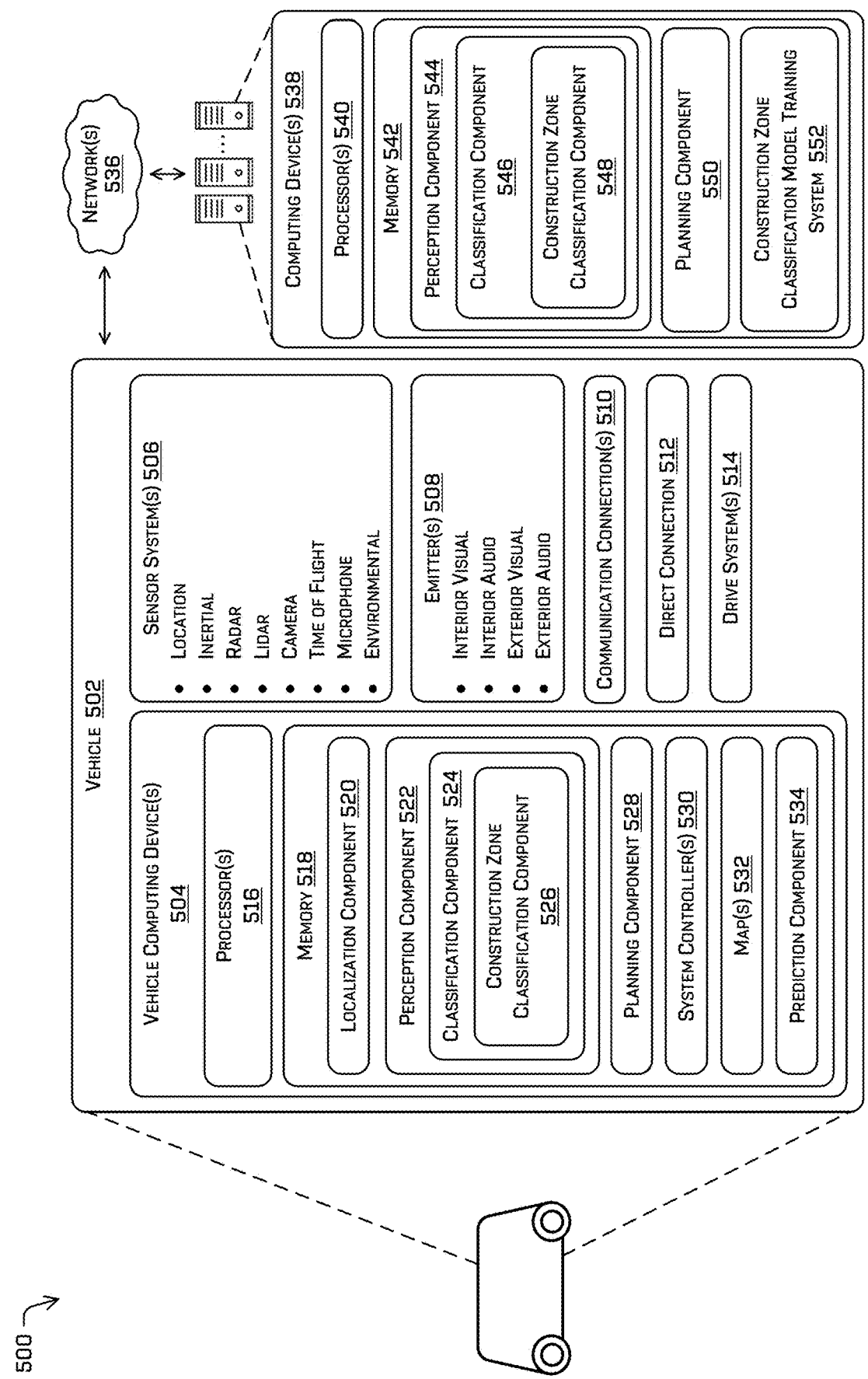
FIG. 5 is a block diagram of an example system for implementing the techniques described herein.

FIG. 4A is a perspective view of an example environment 400 in which a vehicle 402 may be traveling. The vehicle 402 may be configured with one or more sensor systems 404 that may include any one or more sensor of any type (e.g. lidar, radar, sonar, vision, time-of-flight, ultrasonic, infrared, etc.). The vehicle 402 may also be configured with a perception system 406 that may receive sensor data from the sensor system(s) 404. The perception system 406 may perform detection and/or labeling operations using such sensor data. The perception system 406 may include one or more classifiers 408 that may include a construction zone classification component that may perform operations as described herein and one or more other classification components (e.g., feature classification components and/or non-construction zone classification components). The vehicle 402 may further be configured with a vehicle computing system 410 that may include one or more processors 412, a memory 414, a prediction component 416, and a planning component 418, any one or more of which may be used to perform, or in conjunction with the performance of, one or more of the operations described herein.

The environment 400 may include a road 420 on which the vehicle 402 may be traveling, another vehicle 422 traveling on the road 420, road cones 424, a pile of construction rubble 426, and sidewalks 428 and 430. The sensor system(s) 404 may collect data from the environment 400 (e.g., by receiving or otherwise sensing reflected and/or emitted electromagnetic waves in the environment 400) and generate sensor data that the sensor system(s) 404 may provide to the perception system 406. This sensor data may take the form of two-dimensional data and/or three-dimensional data representing and/or otherwise associated with the environment 400. In examples, the sensor data may include two-dimensional images of portions of the environment from a sensor perspective.

The perception system 406 and/or the classifier(s) 408 may include one or more machine-learned models that may have been trained to perform detection and labeling, including construction zone detection and labeling, for example as disclosed herein. The perception system 406 and/or the classifier(s) 408 may execute a classification machine-learned model(s) to perform classification and labeling operations as described herein to determine one or more classifications for the objects, regions, and features in the environment 400. For example, perception system 406 and/or the classifier(s) 408 may detect the vehicle 422, road cones 424, rubble 426, and sidewalks 428 and 430, and determine one or more labels for such detections.

In various examples, as described herein, the perception system 406 and/or the classifier(s) 408 may determine whether to label these detections as being associated with a construction zone (e.g., using a construction zone classification model). The perception system 406 and/or the classifier(s) 408 may also determine a non-construction zone label for these detections (e.g., using one or more feature classification models or other non-construction zone classification models). The perception system 406 and/or the classifier(s) 408 may generate the results of these determinations as separate images with a single label per image pixel (e.g., a construction zone labeled image and a non-construction zone labeled image) and/or as a single image with multiple possible labels per image pixel. The perception system 406 and/or the classifier(s) 408 may then intersect the labels or otherwise determine a label for the individual pixels of an output image using label comparisons and/or one or more criteria. For example, the perception system 406 and/or the classifier(s) 408 may use a hierarchical system of label significance to determine the appropriate labels for the output image pixels.

The output image and associated labels determined by the perception system 406 may be used by the vehicle computing system 410 to perform vehicle control operations. For example and referring now to FIG. 4B providing another perspective view of the example environment 400, the perception system 406 may have detected and determined labels for a construction zone 432, a drivable region 434, and non-drivable regions 436 and 438. The vehicle 422 may also have been detected and labeled as a vehicle. Using these labeled detections, the vehicle computing system 410 may control the vehicle within the drivable region 434, avoiding the construction zone 432 (that may have been within a drivable region normally) and the vehicle 422.

For example, the vehicle computing system 410 may use the planning component 418 to determine a trajectory for the vehicle 402 based on the drivable region 434 and the construction zone 432 determined using the classifier(s) 408 and/or the perception system 406. For example, the planning component may generate a trajectory that slows the vehicle before encountering the construction zone 432 and then controls the vehicle around the construction zone 432 after the vehicle 422 has passed. Because the non-drivable regions 436 and 438 are not drivable regions, the vehicle computing system 410 may exclude such regions from a trajectory generated for the vehicle 402. Similarly, the vehicle computing system 410 may exclude the construction zone 432 from a trajectory generated for the vehicle 402.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522 that may include a classification component 524 and/or a construction zone classification component 526 that may be configured to perform one or more of the construction zone detection and labeling operations and/or machine-learned model training operations described herein, a planning component 528, one or more system controllers 530, one or more maps 532, and a prediction component 534. Though depicted in FIG. 5 as residing in memory 518 for illustrative purposes, it is contemplated that any one or more of the localization component 520, the perception component 522, the classification component 524, the construction zone classification component 526, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, construction zone detection and labeling and machine-learned model training operations as described herein. For example, the perception component may include functionality to analyze sensor data to determine whether to label pixels in images as construction zone pixels, as described herein. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, small, dynamic, non-impeding object, unknown).

In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the voxel data structures generated and two-dimensional sensor data, to generate processed sensor data, which may take the form of two-dimensional images in some examples. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure (e.g., a multichannel data structure, a two-dimensional grid of cells containing data, a two-dimensional representation of a portion of an environment from a sensor perspective, a two-dimensional image, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment and can be loaded into working memory as needed. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures based on return pulses as described herein to generate one or more predicted trajectories for various mobile objects in an environment. In some examples, the prediction component 534 may be a sub-component of perception component 522.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may include one or more convolution/deconvolution layers. Such a CNN may be a component of and/or interact with the classification component 524 and/or the construction zone classification component 526.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time-of-flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable region presence, and/or other data, including data described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., images, labeled images) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning component 550 and/or a perception component 544 that may include a classification component 546 and/or a construction zone classification component 548 that may be configured to perform one or more of the construction zone detection and labeling operations and/or machine-learned model training operations described herein. In some instances, the perception component 544 can substantially correspond to the perception component 522 and can include substantially similar functionality. In some instances, the classification component 546 can substantially correspond to the classification component 524 and can include substantially similar functionality. In some instances, the construction zone classification component 548 can substantially correspond to the construction zone classification component 526 and can include substantially similar functionality. In some instances, the planning component 550 can substantially correspond to the planning component 528 and can include substantially similar functionality. The memory 542 may also store a construction zone classification model training system 552 that may be configured to perform one or more of the construction zone detection and labeling operations and/or machine-learned model training operations described herein.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

Example Clauses

The following paragraphs describe various examples. Any of the examples in this section may be used with any other of the examples in this section and/or any of the other examples described herein.

A: A system comprising: one or more processors; and one or more non-transitory computer-readable media storing instructions executable by the one or more processors, wherein the instructions, when executed, cause the system to perform operations comprising: receiving sensor data associated with a vehicle traversing an environment; determining, based at least in part on the sensor data, a two-dimensional sensor perspective image representing a portion of the environment; determining, based at least in part on the two-dimensional sensor perspective image, a first label for a pixel in the two-dimensional sensor perspective image representing a subset of the portion of the environment; determining, based at least in part on the subset of the portion of the environment, a construction zone label for the pixel; determining, based at least in part on a detection associated with the subset of the portion of the environment, the first label, and the construction zone label, an output image pixel label for the pixel; determining, based at least in part on the pixel and the output image pixel label, an output image; and controlling the vehicle based at least in part on the output image.

B: The system of paragraph A, wherein determining the construction zone label for the pixel comprises executing, based at least in part on the two-dimensional sensor perspective image, a two-dimensional classifier machine-learned (ML) model trained to perform construction zone detection.

C: The system of claim paragraph B, wherein the two-dimensional classifier ML model is trained to perform construction zone detection using one or more of: construction zone labeled training data comprising one or more pixels labeled with the construction zone label; or labeled training data lacking the construction zone label and comprising one or more labeled pixels.

D: The system of paragraph C, wherein the two-dimensional classifier ML model is trained to perform construction zone detection using ground truth data generated from a segmenter applied to the construction zone labeled training data or the labeled training data.

E: The system of any of paragraphs B-D, wherein the two-dimensional classifier ML model is trained to perform construction zone detection by: determining three-dimensional construction zone data; mapping the three-dimensional construction zone data to a second two-dimensional sensor perspective image; and labeling, based at least in part on mapping the three-dimensional construction zone data to the second two-dimensional sensor perspective image, one or more pixels in the second two-dimensional sensor perspective image with the construction zone label.

F: One or more non-transitory computer-readable media storing instructions that, when executed by one or more processors, perform operations comprising: receiving, from a first two-dimensional sensor of a plurality of two-dimensional sensors of a vehicle, sensor data associated with an environment; determining, based at least in part on the sensor data, a two-dimensional image representing a portion of the environment; determining, by a two-dimensional classifier, a first labeled image based at least in part on labeling one or more pixels of the two-dimensional image with a construction zone label; determining a second labeled image associated with a second two-dimensional sensor of the plurality of two-dimensional sensors; performing a fusion operation using the first labeled image and the second labeled image to determine an output image corresponding to the environment; and controlling a vehicle based on the output image.

G: The one or more non-transitory computer-readable media of paragraph F, wherein the two-dimensional classifier comprises a machine-learned (ML) model trained to perform construction zone detection.

H: The one or more non-transitory computer-readable media of paragraph F or G, wherein performing the fusion operation to determine the output image comprises: determining the construction zone label for a first pixel of the first labeled image; determining a label for a second pixel of the second labeled image, wherein the first pixel corresponds to the second pixel, and wherein the label is not a construction zone label; and determining the construction zone label for a third pixel of the output image based at least in part on the construction zone label and the label, wherein the third pixel corresponds to the first pixel and the second pixel.

I: The one or more non-transitory computer-readable media of any of paragraphs F-H, wherein performing the fusion operation to determine the output image comprises: determining the construction zone label for a first pixel of the first labeled image; determining a label that is not the construction zone label for the first pixel of the first labeled image; and determining the label for a second pixel of the output image based at least in part on the construction zone label and the label, wherein the second pixel corresponds to the first pixel.

J: The one or more non-transitory computer-readable media of paragraph I, wherein determining the first labeled image comprises: determining a construction zone label for a first pixel of the first labeled image; determining a dynamic object label for a second pixel of the second labeled image, wherein the first pixel corresponds to the second pixel; and determining the dynamic object label for a third pixel of the output image based at least in part on the construction zone label and the dynamic object label, wherein the third pixel corresponds to the first pixel and the second pixel.

K: The one or more non-transitory computer-readable media of any of paragraphs F-J, wherein performing the fusion operation comprises: determining a first label for a first pixel in the first labeled image; determining a second label for a second pixel in the second labeled image, wherein the first pixel corresponds to the second pixel; and determining a label for a third pixel in the output image based at least in part on the first label and the second label, wherein the third pixel corresponds to the first pixel and the second pixel.

L: The one or more non-transitory computer-readable media of any of paragraphs F-K, wherein the two-dimensional classifier comprises a machine-learned (ML) model trained to perform construction zone detection by: determining three-dimensional construction zone data; mapping the three-dimensional construction zone data to a second two-dimensional sensor perspective image; and determining the construction zone label for one or more pixels in the second two-dimensional sensor perspective image based at least in part on mapping the three-dimensional construction zone data to the second two-dimensional sensor perspective image.

M: The one or more non-transitory computer-readable media of any of paragraphs F-L, wherein the output image comprises a pixel associated with the construction zone label and a label associated with the second labeled image.

N: The one or more non-transitory computer-readable media of any of paragraphs F-M, wherein controlling the vehicle comprises providing the output image to a trajectory determination system configured to determine a vehicle trajectory based at least in part on the output image.

O: A method comprising: receiving sensor data representing an environment from a first two-dimensional sensor of a plurality of two-dimensional sensors configured at a vehicle; determining, based at least in part on the sensor data, a two-dimensional image representing a portion of the environment; determining, by a two-dimensional classifier, one or more segmentations associated with the two-dimensional image; determining, by the two-dimensional classifier based at least in part on the one or more segmentations associated with the two-dimensional image, a first labeled image comprising one or more construction zone labels; determining a second labeled image associated with a second two-dimensional sensor of the plurality of two-dimensional sensors; performing a fusion operation using the first labeled image and the second labeled image to determine an output image; and controlling a vehicle based on the output image.

P: The method of paragraph O, wherein the two-dimensional classifier comprises a machine-learned (ML) model trained to perform construction zone detection by: determining that a first segmentation of a second two-dimensional image labeled with a construction zone label occludes a second segmentation of the second two-dimensional image labeled with a label that is not the construction zone label; and determining the label for the second segmentation based at least in part on determining that the first segmentation occludes the second segmentation.

Q: The method of paragraph P, wherein the second segmentation is associated with a dynamic object.

R: The method of any of paragraphs O-Q, wherein controlling the vehicle comprises: using the output image to determine a top-down representation of the environment; and controlling the vehicle based at least in part on the down representation.

S: The method of any of paragraphs O-R, wherein controlling the vehicle comprises one or more of: providing the output image to a machine-learned (ML) model to train the ML model to perform construction zone detection based at least in part on the output image; or providing the output image to one or more components of a vehicle computing system configured to control a vehicle based at least in part on the output image.

T: The method of any of paragraphs O-S, wherein the output image comprises one or more bounding boxes encompassing one or more pixels associated with a construction zone label.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving sensor data associated with a vehicle traversing an environment;
determining, based at least in part on the sensor data, a two-dimensional sensor perspective image representing a portion of the environment;
determining, based at least in part on the two-dimensional sensor perspective image, a first label for a pixel in the two-dimensional sensor perspective image representing a subset of the portion of the environment, the first label associated with a first risk indicative of a first collision probability;
determining, based at least in part on the subset of the portion of the environment, a construction zone label for the pixel, the construction zone label being associated with a second risk indicative of a second collision probability;
determining an output image pixel label for the pixel based at least in part on:
comparing the first risk to the second risk,
a detection associated with the subset of the portion of the environment, the first label, and the construction zone label;
determining, based at least in part on the pixel and the output image pixel label, an output image;
determining, based at least in part on the output image, a top-down representation of the environment; and
controlling the vehicle based at least in part on the top-down representation of the environment.

2. The system of claim 1, wherein determining the construction zone label for the pixel comprises executing, based at least in part on the two-dimensional sensor perspective image, a two-dimensional classifier machine-learned (ML) model trained to perform construction zone detection.

3. The system of claim 2, wherein the two-dimensional classifier ML model is trained to perform construction zone detection using one or more of:
construction zone labeled training data comprising one or more pixels labeled with the construction zone label; or
labeled training data lacking the construction zone label and comprising one or more labeled pixels.

4. The system of claim 3, wherein the two-dimensional classifier ML model is trained to perform construction zone detection using ground truth data generated from a segmenter applied to the construction zone labeled training data or the labeled training data.

5. The system of claim 2, wherein the two-dimensional classifier ML model is trained to perform construction zone detection by:
determining three-dimensional construction zone data;
mapping the three-dimensional construction zone data to a second two-dimensional sensor perspective image; and
labeling, based at least in part on mapping the three-dimensional construction zone data to the second two-dimensional sensor perspective image, one or more pixels in the second two-dimensional sensor perspective image with the construction zone label.

6. One or more non-transitory computer-readable media storing instructions that, when executed by one or more processors, perform operations comprising:
receiving, from a first two-dimensional sensor of a plurality of two-dimensional sensors of a vehicle, sensor data associated with an environment;
determining, based at least in part on the sensor data, a two-dimensional image representing a portion of the environment;
determining, by a two-dimensional classifier, a first labeled image based at least in part on labeling one or more pixels of the two-dimensional image with a construction zone label, the two-dimensional classifier comprising a machine-learned (ML) model trained to:
determine three-dimensional construction zone data; and
map the three-dimensional construction zone data to the two-dimensional image;
determining a second labeled image associated with a second two-dimensional sensor of the plurality of two-dimensional sensors;
performing a fusion operation using the first labeled image and the second labeled image to determine an output image corresponding to the environment, wherein determining the output image comprises comparing a first risk associated with the first labeled image with a second risk associated with the second labeled image; and
controlling the vehicle based on the output image.

7. The one or more non-transitory computer-readable media of claim 6, wherein performing the fusion operation to determine the output image comprises:

determining the construction zone label for a first pixel of the first labeled image;

determining a label for a second pixel of the second labeled image, wherein the first pixel corresponds to the second pixel, and wherein the label is not the construction zone label; and determining the construction zone label for a third pixel of the output image based at least in part on the construction zone label and the label, wherein the third pixel corresponds to the first pixel and the second pixel.

8. The one or more non-transitory computer-readable media of claim 6, wherein performing the fusion operation to determine the output image comprises:

determining the construction zone label for a first pixel of the first labeled image;

determining a first label that is not the construction zone label for the first pixel of the first labeled image; and determining a second label for a second pixel of the output image based at least in part on the construction zone label and the second label, wherein the second pixel corresponds to the first pixel.

9. The one or more non-transitory computer-readable media of claim 8, wherein determining the first labeled image comprises:

determining the construction zone label for the first pixel of the first labeled image;

determining a dynamic object label for the second pixel of the second labeled image, wherein the first pixel corresponds to the second pixel; and determining the dynamic object label for a third pixel of the output image based at least in part on the construction zone label and the dynamic object label, wherein the third pixel corresponds to the first pixel and the second pixel.

10. The one or more non-transitory computer-readable media of claim 6, wherein performing the fusion operation comprises:

determining a first label for a first pixel in the first labeled image;

determining a second label for a second pixel in the second labeled image, wherein the first pixel corresponds to the second pixel; and determining a label for a third pixel in the output image based at least in part on the first label and the second label, wherein the third pixel corresponds to the first pixel and the second pixel.

11. The one or more non-transitory computer-readable media of claim 6, wherein the machine-learned (ML) model is further trained to perform construction zone detection by:

determining the construction zone label for one or more pixels in a second two-dimensional sensor perspective image based at least in part on mapping the three-dimensional construction zone data to the second two-dimensional sensor perspective image.

12. The one or more non-transitory computer-readable media of claim 6, wherein the output image comprises a pixel associated with the construction zone label and a label associated with the second labeled image.

13. The one or more non-transitory computer-readable media of claim 6, wherein controlling the vehicle comprises providing the output image to a trajectory determination system configured to determine a vehicle trajectory based at least in part on the output image.

14. The one or more non-transitory computer-readable media of claim 6, wherein the output image is further based at least in part on a hierarchical system of label significance.

15. The one or more non-transitory computer-readable media of claim 6, wherein the output image is further based at least in part on a first confidence value associated with the construction zone label and a second confidence value associated with the second labeled image.

16. The one or more non-transitory computer-readable media of claim 6, the operations further comprising:

determining the first risk associated with the first labeled image, the first risk representing a first likelihood of collision; and determining the second risk associated with the second labeled image, the second risk representing a second likelihood of collision.

17. A method comprising:

receiving sensor data representing an environment from a first two-dimensional sensor of a plurality of two-dimensional sensors configured at a vehicle;

determining, based at least in part on the sensor data, a two-dimensional image representing a portion of the environment;

determining, by a two-dimensional classifier, one or more segmentations associated with the two-dimensional image;

determining, by the two-dimensional classifier based at least in part on the one or more segmentations associated with the two-dimensional image, a first labeled image comprising one or more construction zone labels, the two-dimensional classifier comprising a machine-learned (ML) model trained to:

determine three-dimensional construction zone data; and associate the three-dimensional construction zone data to the two-dimensional image;

determining a second labeled image associated with a second two-dimensional sensor of the plurality of two-dimensional sensors;

performing a fusion operation using the first labeled image and the second labeled image to determine an output image, the output image based at least in part on comparing a first risk associated with the first labeled image with a second risk associated with the second labeled image; and controlling the vehicle based on the output image.

18. The method of claim 17, wherein the machine-learned (ML) model is further trained to perform construction zone detection by:

determining that a first segmentation of a second two-dimensional image labeled with a construction zone label occludes a second segmentation of the second two-dimensional image labeled with a label that is not the construction zone label; and determining the label for the second segmentation based at least in part on determining that the first segmentation occludes the second segmentation.

19. The method of claim 17, wherein controlling the vehicle comprises one or more of:

providing the output image to the machine-learned (ML) model to train the ML model to perform construction zone detection based at least in part on the output image; or providing the output image to one or more components of a vehicle computing system configured to control the vehicle based at least in part on the output image.

20. The method of claim 17, wherein the output image comprises one or more bounding boxes encompassing one or more pixels associated with a construction zone label.

* * * * *